R. NUTTING.
Vegetable Cutter.
No. 38,055.
Patented March 31, 1863.
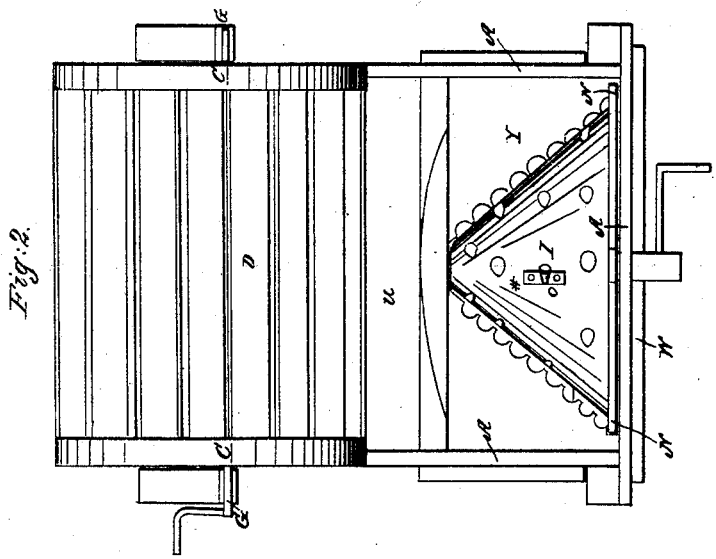
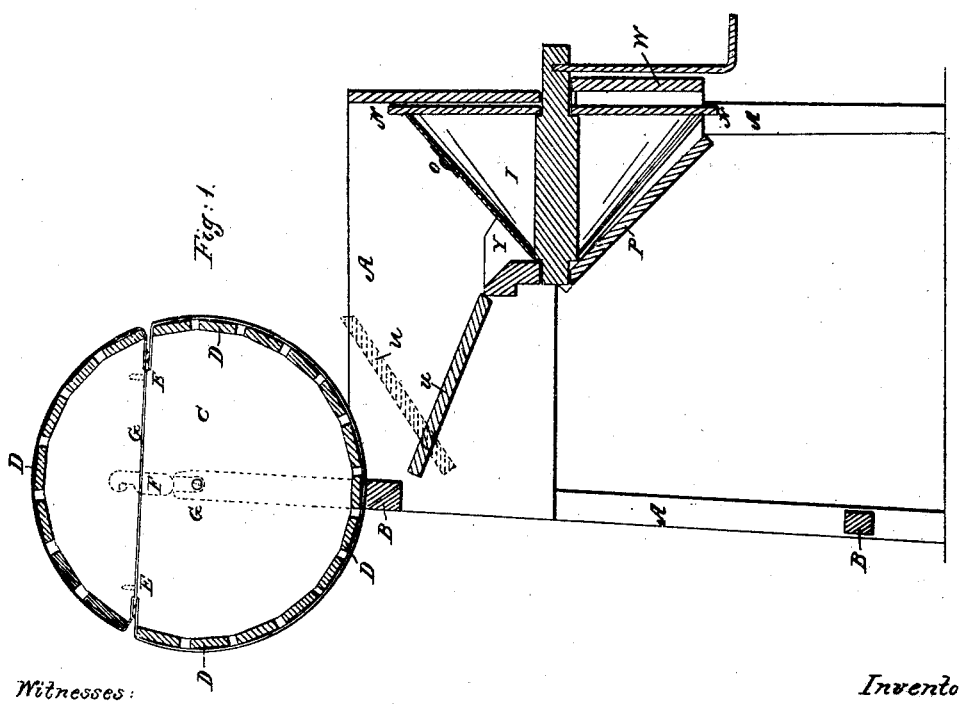

UNITED STATES PATENT OFFICE.

RUFUS NUTTING, OF RANDOLPH, VERMONT.

IMPROVEMENT IN VEGETABLE-CUTTERS.

Specification forming part of Letters Patent No. 38,055, dated March 31, 1863.

*To all whom it may concern:*

Be it known that I, RUFUS NUTTING, of Randolph, county of Orange, and State of Vermont, have invented Improvements in Vegetable-Cutters; and I do hereby declare that the following is a full and exact description thereof, reference being had to the accompanying drawings, and the letters of reference marked thereon.

The nature of my invention consists in constructing vegetable-cutters in such a manner that they shall remove from vegetables before cutting the gravel and dirt adhering to them, (which, if not removed, dulls the cutters or knives, and injures the teeth, stomach, and intestines of stock;) also cut them into thinner and smaller pieces or strips than other machines do, which are more suitable for feeding separately or mixing with meal, grain, cut-stocks, straw, or hay, and also be more substantial and less liable to disarrangement than the ordinary vegetable-cutters having a plane wheel or disk upon an arbor.

The wooden part of this machine may be made of pine or other wood, and the common size is about three and a half feet high to the top of the frame A, and the box or hopper part of said frame is about twenty or twenty-two inches square and twelve inches deep. The legs are about two inches square, and the front ones about three and a half feet long and the back ones about four feet and two inches long, all of them being firmly confined to the box A by glue and nails, or screws, or any better way. The back legs are framed together by the cross-bars B, and at the upper end furnish a bearing for the gudgeons G, upon which the cylinder C revolves. This cylinder is about eighteen inches in diameter, and the length is about one-half inch less than the distance between the two back legs, that it may revolve freely between them. The ends of it, C, are made of boards about one inch in thickness, and having twelve to sixteen equal sides, upon which are nailed slats or staves D, of about one-half inch in thickness and such width as will leave about one-half inch space between them for dirt to fall through. An iron hoop is firmly put around each end of each section of this cylinder, its ends or heads being made in two parts, as indicated by the dotted line C, doweled together by pins E and fastened by the hook F in each end.

The gudgeons G may be made of cast-iron, with a collar, through which screws or bolts pass and hold them firmly to their place, or in any better way, and the cylinder may be revolved by a crank in the usual manner.

The conical-shaped hollow cylinder or cone I may be made of cast or wrought iron, or other strong metal, of sufficient thickness to be firm and not easily indented or bruised by the falling of large vegetables upon it. It is about two inches at its smallest and eighteen inches at its largest diameter, with a rim or felly about one-half inch thick and one inch wide, making the extreme diameter from N to N about twenty inches.

The gudgeon or arbor to which the crank is attached may be connected to a "spider," and that to the rim or felly of the cone, in any desirable manner.

The knives or cutters O are made of plate-steel, of suitable width and thickness, by being swaged or pressed into a mold of such form and in such manner that the cutting or projecting part is left in the form of a half-cone, with a sufficient space on each side thereof to allow of a hole being made through which the rivet or screw passes that confines it to the cone I, as seen at X. There should be from twenty-six to thirty-four of these cutters for each cone, firmly attached thereto by rivets or otherwise, about midway over a corresponding number of elliptical or egg-shaped holes, (such being less liable to clog than round holes,) about one inch in diameter by one and a half inches long, equally distributed in lines or circles about seven-eighths of an inch apart around the cone, there being three or four cutters in each line or circle, and eight or nine circles, according to the size of the cone.

P is an inclined board for conducting any small pieces of vegetables that may fall through the holes of the cone into the receptacle for them, the chief part of the cut vegetables passing directly out of the lowest part of the cone.

U is a part of the under side of the hopper, so hung upon a pivot at each end that when the cylinder C is in use it may be turned up, as seen at V, to carry the dirt out or away from the hopper.

W is an apron or projecting board, to prevent the pieces of vegetables from scattering in front.

Y is a triangular board, forming a part of the bottom of the hopper, as closely fitted to the cone I as may be, having semicircular notches on the edge next the cone to allow the cutters to pass, there being another similar piece forming the opposite portion of the hopper, both descending toward the cone, the corner of the first-named piece next the rim or felly being the lowest point.

The operation of this machine consists in, first, turning up U to the position of V, then remove the upper part of cylinder C, and put the vegetables into the lower section, and after returning the upper section to its place, turning the cylinder to the right twenty to fifty revolutions, or until the gravel and dirt is removed from them, falling through the spaces between the slats. Then let down U to its first position, and after removing the upper section of C, as before, turn it about one-fourth around, so that the vegetables will roll out into the hopper, from whence they will be rapidly cut into curved strips and bits about one sixteenth of an inch thick and three-fourths inch wide, by turning the cylinder or cone I to the right, the pieces passing into the cone and falling down and out, as before described.

The conical form of the cutter-plate or cone I, with its gudgeons, instead of a plane plate and arbor running through it in the common way, is more reliable and permanent, and less liable to gradual displacement by the longitudinal wearing of the collar or shoulders of the arbor or gudgeons, as in the common way the vegetables in the hopper press against the side of the plate at a right angle with its arbor, and tend continually to move and wear it endwise, whereas in this improvement the vegetables press against the cone or cutter-plate at an angle of forty-five degrees with the gudgeons; also, the plate itself, being conical and bracing, is less liable to spring and crack by pressure or blows than a plane and flat plate. The conical form also having a larger superficial surface within the same diameter admits of a greater number of knives or cutters, although they are placed on lines nearly twice as far apart as in "Willard's" patent, in consequence of which greater distance apart the bottom of the hopper may be fitted up more closely to the cutter-plate, so as to prevent the vegetables from going through until they are cut up more perfectly; also, there being more cutters within the same diameter, vegetables may be cut more rapidly and with less power.

I have experimented with cylinders having parallel sides, inclining them some ten to fifteen degrees to let the cut vegetables out at one end, but, although superior to the plane plate, I prefer the conical form to either. I have also contemplated the vertical position, instead of the horizontal, (as herein described,) for the conical cylinder, but have never fully tested it, though may eventually adopt that position as the best.

Inasmuch as more or less dirt and gravel usually adheres to subterraneous vegetables, which, when it comes in contact with vegetable cutters or knives, dulls and blunts the edge of them rapidly, and when fed with food to farm-stock makes them less thrifty and appear prematurely old by wearing off their teeth, so that they cannot masticate as well, and by mechanically and medicinally causing an unnatural and unhealthy condition of their vitals, it is very important that there should be some cheap and convenient method of removing it in combination with every vegetable-cutter, as herein described.

What I claim, and desire to secure by Letters Patent as my invention, is—

1. The conical-shaped hollow cylinder, in combination with the semi-conical-shaped knives or cutters and elliptical or egg shaped holes, constructed substantially as and for the purposes herein set forth.

2. The cylinder C, or its equivalent, for removing from vegetables, before cutting, the dirt and gravel, which otherwise would dull the cutters and injure the teeth, stomach, and intestines of animals, in combination with the conical cylinder, or other device for cutting vegetables, substantially as set forth.

RUFUS NUTTING.

Witnesses:
L. H. NUTTING,
W. M. NUTTING.